March 13, 1956 I. J. P. JAMES ET AL 2,738,379

COLOR TELEVISION APPARATUS

Filed Dec. 19, 1951 2 Sheets-Sheet 1

Inventors:
IVANHOE JOHN PENFOUND JAMES
JAMES ALEC LODGE
BY Ralph E. Atherton
Attorney March 13, 1956 I. J. P. JAMES ET AL 2,738,379

COLOR TELEVISION APPARATUS

Filed Dec. 19, 1951 2 Sheets-Sheet 2

Inventors:
IVANHOE JOHN PENFOUND JAMES
JAMES ALEC LODGE
BY Ralph E. Atherton
Attorney United States Patent Office 2,738,379

Patented Mar. 13, 1956

2,738,379

COLOR TELEVISION APPARATUS

Ivanhoe John Penfound James, South Ealing, London, and James Alec Lodge, Ickenham, Uxbridge, England, assignors to Electric & Musical Industries Limited, Hayes, England, a British company Application December 19, 1951, Serial No. 262,361

Claims priority, application Great Britain December 23, 1950

10 Claims. (Cl. 178—5.4)

This invention relates to color television apparatus.

It has been proposed to generate picture signals for color television by projecting a light image of mixed colors on to the target of a conventional television pick-up tube through a multiple section color filter whereby the target is illuminated with different color components of different elemental areas of the light image. The video signals generated in operating the tube then comprise intercalated signal elements representative of the different color components and it is in general desirable to separate the signals into different channels so that the signals in each channel are representative only of a single color component. This gives rise to difficulties because even if the sections of the color filter are arranged according to a regularly recurrent sequence, any non-linearity in the scanning in the pick-up tube would produce aperiodicity in the recurrence of the signal elements representative of the different colors. It has, therefore, been proposed, in order to facilitate such separation, to illuminate the target continuously with lights of different colors in such manner that the signal elements representative of the different colors are biassed so as to confine them to different amplitude ranges. However, this expediency is not of itself free from disadvantages, for apart from involving the use of a plurality of biassing light sources, there is the disadvantage that the peak-to-peak amplitude of the signals representative of each component color is limited to a relatively small fraction of the overall amplitude.

An object of the present invention is to provide improved color television apparatus of the kind in which video signals are generated comprising interspersed signal elements representative of different color components, mainly with a view to avoiding disadvantages encountered in separating such signal elements.

Another object of the present invention is to provide improved color television apparatus of the kind in which video signals are generated comprising intercalated signal elements representative of different color components and wherein separation of the signal elements representative of different colors can be effected with reliability, regardless of scanning non-uniformities and regardless of the nature of the image being televised.

Another object of the present invention is to provide improved color television apparatus of the kind in which video signals are generated comprising intercalated signal elements representative of different color components and wherein the separation of the signal elements representative of different colors can be effected with reliability, without employing a separate biassing light for each color component.

A further object of the present invention is to provide improved color television apparatus of the kind in which video signals are generated comprising intercalated signal elements representative of different color components, and wherein the means for separating the signal elements representative of different colors is also utilized to improve scanning linearity in the pick-up device used for generating the signals.

Another object of the present invention is to provide simplified color television apparatus for generating color television signals which are of relatively high definition as regards picture detail but of lower definition as regards color information.

In order that the said invention may be clearly understood and readily carried into effect, the same will now be more fully described with reference to the accompanying drawings in which.

Figures 3, 4A, 4B:
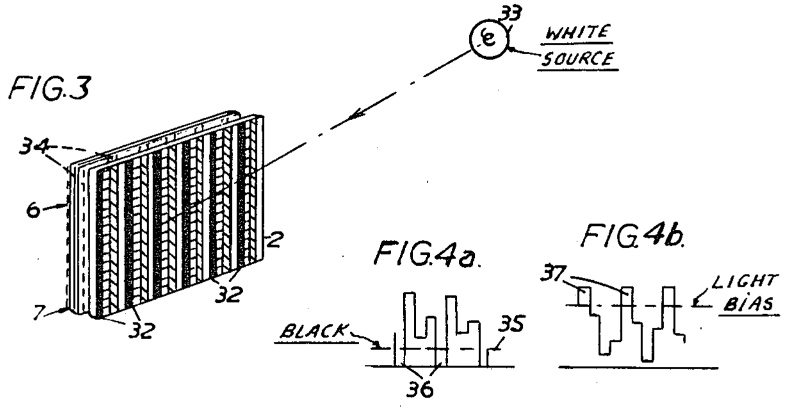
Figure 3 illustrates a modification of Figure 1.
Figure 5:
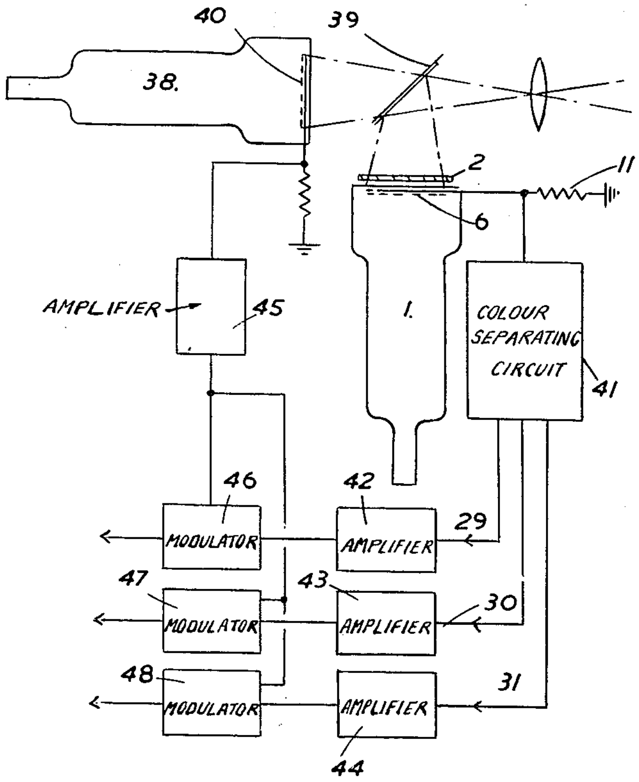

Figures 4*a* and 4*b* are waveform diagrams explanatory of the operation of Figure 3, and Figure 5 illustrates another application of the present invention.

Figures 1, 2:
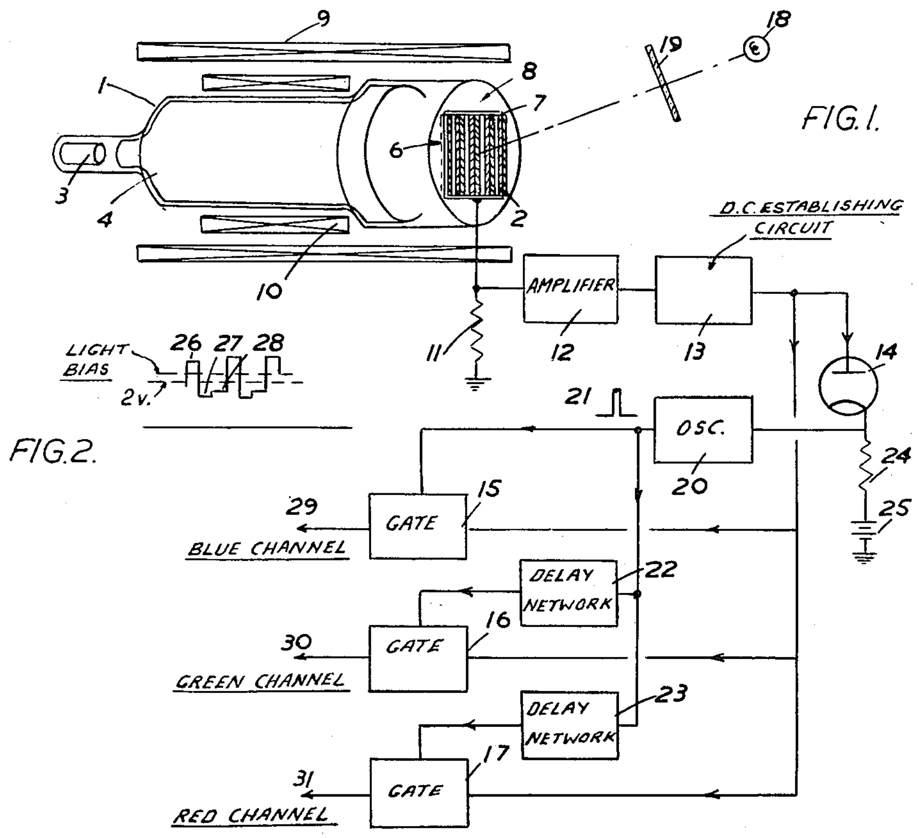
Figure 1 illustrates one application of the present invention.
Figure 2 is a waveform diagram explanatory of the operation of Figure 1.

Referring to the drawings, the arrangement shown in Figure 1 comprises a television pick-up tube 1 of the kind adapted to operate with cathode potential stabilisation, the tube being of conventional construction (apart from a multi-section color mosaic 2, which will be referred to later), and comprises the usual electron gun 3, wall anode 4, and target structure comprising a photo-electrically sensitive mosaic screen 6 and transparent conductive signal plate 7. The target structure is mounted on the inner surface of the end wall 8 of the tube 1 which constitutes the optical window thereof. The tube is provided with the usual focussing solenoid 9 and deflecting coils indicated diagrammatically at 10. A high impedance load 11 is connected between the signal plate 7 and ground, as shown, and electrical signals set up across this load are applied to an amplifier 12 and thence to a D. C. establishing circuit 13 which may be of any suitable construction. The output from the D. C. establishing circuit 13 is fed in parallel to the anode of a diode valve 14 and to the input side of three gates 15, 16, and 17. The gates are merely shown in block form since they may be of any suitable construction.

The color filter 2 is applied as close as possible to the mosaic screen and is of the same area as the letter. Alternatively a lens may be disposed between the filter and the mosaic screen in such a position as to focus an image of the filter on the mosaic screen. The filter 2 is merely indicated diagrammatically but it comprises translucent strips of blue, green and red color arranged in a regular sequence from one edge of the filter to the other, the strips extending effectively at right angles to the lines scanned on the mosaic screen 6 by the beam in the cathode ray tube 1. Consequently if a light image of mixed colors is focussed on to the mosaic screen 6 elements of the mosaic screen are illuminated by different color components of the elements of the light image in accordance with the pattern of the color filter. The mosaic screen 6 is, moreover, illuminated continuously through the filter 2 with a steady blue light from the light source 18 having a blue filter 19. A steady light bias is therefore applied to those elements of the mosaic screen 6 which are illuminated through the blue strips of the filter 2.

The gates 15, 16 and 17 are controlled by an oscillator 20 which is merely shown in block form since it may be of any suitable construction; for example, it may be a multivibrator. The oscillator 20 is adjusted to have a free running frequency of one third the "picture-dot" frequency, that is the frequency with which in operation the scanning beam in the tube 1 traverses the strips of the color mosaic. The output of the oscillator 20 is in the form of rectangular pulses, one of which is indicated at 21, each of a duration rather less than one picture-dot period. The pulses 21 are fed directly to the gate 15 and are fed to the gates 16 and 17 via delay networks 22 and 23. The delay network 22 delays the application of each pulse 21 to the gate 16 by one picture-dot period while the delay network 23 delays the application of each pulse 21 by two picture-dot periods. The diode valve 14 is biassed at its cathode via a resistance 24 to a level +2 volts from a potential source indicated conventionally at 25 and the cathode is coupled to an electrode of the oscillator 20 whereas synchronisation of the oscillator could be effected by pulses transmitted by the diode valve 14.

In operation of the apparatus, the mosaic screen 6 is scanned with a low velocity beam of electrons generated by the gun 3 and, in known manner, sets up a signal output across the output load 11 representative of the light image focussed on the mosaic screen 6. Due to the presence of the color filter 2, generated signals comprise signal elements representative of blue, green and red components of different elements or dots of the light image, the signal elements being intercalated in accordance with the pattern of the filter 2. After suitable amplification by the amplifier 12, the D. C. component of the signals is established by the circuit 13 and it is arranged that the light source 18 biasses blue signal elements so that in the output from the circuit 13, their black level, that is the level corresponding to no blue component in the light image focussed on the mosaic screen, slightly exceeds +2 volts. Moreover, it is arranged that the peak level of green and red elements does not exceed 2 volts, the black level for signal elements of these colours being zero volts. A fraction of the signal output from the circuit 13 may have the form indicated in Figure 2 in which the elements 26, 27 and 28 represent the content of the blue, green and red components of three successive dots of the light image focussed on the mosaic screen 6, the blue component being superimposed on a bias of somewhat more than +2 volts. Therefore even in the absence of a blue component in the light image focussed on the mosiac screen 6 every third picture element in the output from the D. C. establishing circuit 13 is in the form of a pulse which always exceeds the maximum level of the intervening signal element. Thus there is produced signal elements which, regardless of the nature of the image being televised, recur in a predetermined sequence in the signal train derived from the pick-up tube and are confined to a separate amplitude range from the intervening signal elements. When the signal output from the circuit 13 is applied to the anode of the diode valve 14 the diode valve remains non-conducting except during the occurrence of these signal elements of extreme level, but is rendered conducting during these elements to transmit a pulse to the oscillator 20. This pulse functions to synchronise the oscillator and maintain the oscillator precisely in step with the scanning of the color elements despite such non-linearity of scanning as is likely to be encountered in practice. When the oscillator is thus synchronised, its output pulses 21 open the gate 15 only during the blue elements of the picture signals so that only blue elements are passed by the gate 15 to the "blue" channel of the equipment, represented diagrammatically by the conductor 29. Similarly, by reason of the delay network 22 the gate 16 is opened only during green elements of the picture signals to allow the passage of signal elements to the "green" channel 30 of the equipment, and by virtue of the delay network 23 the gate 17 is opened only during red elements of the picture signals to allow the passage of picture elements to the "red" channel 31 of the equipment. The blue, green and red elements in the various channels can be integrated to produce simultaneous fields of each of the colors and these color fields can then be used to produce color television signals of the field sequential type or alternatively of the simultaneous type. However, the signal elements in the various channels can also be used, if required, for the production of signals of the line sequential or dot sequential type.

In the foregoing arrangement, it will be evident that the biassed color need not necessarily be blue but it is preferred to select blue since it is the least important color on band-width consideration and therefore the loss of definition which sometimes occurs at high signal levels is of least importance. Moreover, by biassing only a single color as compared with two colors as in the apparatus described in our co-pending British patent application No. 31,317/50, the useful amplitude range available for the unbiassed colors can be approximately doubled. Moreover, the means for gating the individual color channels need not take the specific form described with reference to Figure 1 since there are a variety of means available in the electronic art for gating a plurality of channels successively. For example, a pulse generator generating successive groups of three pulses at picture-dot frequency may replace oscillator 20 and its associated delay networks 22 and 23. Moreover, the gate 15 may in some cases be dispensed with and the signals set up at the cathode of diode valve 14 passed directly to the blue channel 29.

In the modification illustrated in Figure 3, color biassing is dispensed with and the color filter 2 is provided with a vertical strip 32, which is opaque to scene lighting, between successive groups of three strips colored blue, green and red respectively. In one application of this modification, the light image from the object to be televised is projected on to the mosaic screen 6 through the filter 2 in the usual manner, and in addition the filter is continuously illuminated from the front with white light from a biassing source 33. The elements of the mosaic screen illuminated through the colored strips are then effectively equally biassed whereas the elements shielded by the strips 32 are unbiassed, these elements being indicated by the strips 34 in Figure 3. The amount of white light is controlled so that all the color signal elements, as received from the output of the circuit 13, are biassed about 10 to 20 per cent above the signal level corresponding to no illumination of the mosaic screen. This is illustrated in Figure 4*a* where the bias level is indicated by the dotted line 35 and represents black level for the video signals. These video signals occur in groups of three elements representative of blue, green and red components of three successive elements of the light image, with the groups separated by pulses 36 extending in the blacker-than-black sense to the true black level of the pick-up tube 1, that is to say zero volts. Pulses 36 are employed to synchronise the oscillator 20 in the same way as the signals of extreme level are used in Figure 1, although it will be appreciated that where the synchronising pulses extend in the blacker-than-black sense the diode valve 14 requires to be reversed and biassed so as to conduct only when the signal level falls below the signal level 35. Moreover, an additional delay network is required in the output of oscillator 20.

The color filter 2 illustrated in Figure 3 may alternatively be used by illuminating the opaque strips 32 at the rear, that is the side facing the mosaic screen 6, for example by edge lighting, by general illumination of the rear of the filter 2, or by coating the opaque strips at the rear with fluorescent material and irradiating them with ultra violet light. The intensity of the illumination of these opaque strips is arranged to be such as to produce a pulse output from the pick-up tube of greater amplitude than any of the video signal elements and as illustrated in Figure 4*b*, the effect is to produce whiter-than-white synchronising signals 37 between successive groups of three picture elements. These synchronising pulses are employed to synchronise the oscillator 20 in the manner already described, the diode valve 14 being suitably connected and biassed to be responsive only to the pulse 37.

The modification described with reference to Figures 3 and 4 has the advantage that practically the full amplitude range of the pick-up tube can be utilised for all colors since the synchronising signals amplitude need only to be about 10 to 20 per cent of the peak to peak level of the color signal elements. It is preferable to bias the color elements with white light to produce a signal output such as illustrated in Figure 4*a* since in this case the relative amplitudes of the color-signal elements and the synchronising signals are not liable to be disturbed by large changes in the intensity of the incident light.

In the arrangement shown in Figure 5, the pick-up tube 1 provided with the color filter 2 is associated with a further pick-up tube 38 which has no color filter and therefore generates standard black and white signals. The light image to be televised is split by a partially silver mirror 39 and projected partially on the mosaic screen 40 of the tube 38 and partially on the mosaic screen 6 of the tube 1 through the color filter 2. The color filter of this arrangement may be of coarser granularity than the filter employed in the arrangements described with reference to Figures 1 and 3 but may otherwise be similar to either of the constructions described. The filter may, for example, have between 70 and 80 strips or even less. The different color elements in the video signal output of the tube 1 are distributed to the respective blue, green and red channels 29, 30 and 31 by a circuit such as described with reference to Figure 1, such circuit being merely indicated in Figure 5 by the block 41. Narrow band amplifiers 42, 43 and 44 are provided to amplify the signals in the channels 29, 30 and 31 and the amplifiers are arranged to have such time delays that their outputs comprise three simultaneous sequences of low definition color signals, the sequences representing respectively, the blue, green and red components of the light image projected on the screen 6. An amplifier 45 is provided for amplifying the black and white signal output from the tube 38, which it will be appreciated represents the mixed color content of the light image, and the amplifier 45 is arranged also to delay this signal output to render it co-incident with the three sequences of low definition color signals. The amplifier 45 is a wide-band amplifier arranged to pass all the principal frequency components of the signal output from the tube 38. The signal output from the amplifier 45 is then applied in parallel to three modulators 46, 47 and 48 in which this output is modulated respectively with the color signals from the amplifiers 42, 43 and 44. There is therefore obtained from the respective modulators three simultaneous sequences of video signals, each of which is of high definition as regards picture detail. One sequence is, however, modulated with low definition color signals from the amplifier 42, so that it corresponds to a blue color field, the second sequence is modulated with low definition color signals from the amplifier 43, so that it corresponds to a green color field, and the third sequence is modulated with low definition color signals from the amplifier 44, so that it corresponds to a red color field.

The arrangement illustrated in Figure 5 has the advantage over those described with reference to Figures 1 and 3 in that the number of strips in the filter 2 can be made sufficiently small so that 100 per cent color modulation at repetition frequency can be obtained with existing pick-up tubes. Therefore pure color separation and clearly defined synchronising pulses can be obtained. Moreover, since only a low definition output is required from the pick-up tube 1, the splitting of the light image by the mirror 39 may be biassed in favor of the pick-up tube 38 to improve the signal-to-noise ratio in the high definition signals obtained from the latter tube. Furthermore since the color signals are of low definition, registration problems should be reduced.

In a modification of the arrangement illustrated in Figure 5, the amplifier 45 is arranged to suppress frequencies in the pass band of the amplifiers 42, 43 and 44. In this case the modulators 46, 47 and 48 are unnecessary, and the signals from the amplifiers 45 can be added directly to the color signals from amplifiers 42, 43 and 44.

The employment of a white biassing light as in some application of the present invention, is advantageous where the pick-up tube is of the type operating with cathode potential stabilisation, since in this case the biassing light serves to reduce lag effects of the tube.

If these signals derived from apparatus in accordance with the present invention are employed to produce field sequential color transmissions, so that only one color is made use of during each field period, blackout pulses can be applied to the modulating electrode or electrodes of the pick-up tube 1 so that each color dot on the mosaic screen 6 is only discharged during the required field. Storage by the mosaic screen 6 can therefore be increased by a factor of about 3 giving an improved signal-to-noise ratio. Moreover, the signals of extreme level in the output from the pick-up tube 1 which are employed to synchronise the oscillator 20 may also be employed to control the linearity of the line scanning circuit of the pick-up tube. To achieve this the signals of extreme level are compared in frequency with a suitable reference frequency and a correcting signal derived which is dependent upon differences in the compared frequencies. The correcting signal is then employed to linearise the operation of the scanning circuit and incidentally to maintain the extreme level signals constant in frequency. If provision is made for such correction a storage device can be provided for storing the correcting signal and in this case the biassing light 18 or 33 can be switched on and the pick-up tube operated prior to initiating the generation of picture signals to generate a correcting signal, which is then stored in the storage device and used repeatedly during the generation of picture signals to linearise the line scanning circuit. With this arrangement the biassing light can be switched off during the actual picture signal generation. This proposal is generally applicable where it is desired to linearise the scanning of a cathode ray tube the principle being that of generating and storing a correcting signal by scanning a charge image representative of a light image having regularly arranged intensity variations.

A correcting signal generated in a similar way can also be employed for correcting the linearity of the frame scanning circuit of the pick-up tube 1. Moreover, if the equipment employs more than one pick-up tube, as described with reference to Figure 5, the correcting signal may be employed to synchronise the scanning of the different pick-up tubes.

What we claim is:

1. Color television apparatus comprising an image pick-up device for generating a signal train comprising signal elements intercalated according to a color sequence and representative of different color components of elements of the image, means for producing signal elements recurring in a predetermined sequence, in said signal train and confined to a separate amplitude range from signal elements "representing" said different color components, a plurality of signal channels with one for each of said color components, a gate leading to each signal channel, means for applying said signal train to said gates, and means responsive to said recurring signal elements for opening said gates in succession to admit the signal elements representative of said different color components to the corresponding signal channels.

2. Color television apparatus comprising an image pick-up tube including a photoelectrically sensitive surface and scanning means for generating electrical signals representative of a light image projected on said surface, a color filter comprising cyclically recurring groups of at least three differently colored filter elements, said color filter being disposed to filter a light image projected to said surface to cause the signal output of said tube to comprise intercalated signal elements representative of at least three different color components of elements of the light image, means for illuminating said surface through said filter with a biassing light of a single one of said colors to produce recurrent signals in said signal output confined to a separate amplitude range from intervening signal elements, a plurality of signal channels with one for each of said color components, a gate leading to each signal channel, means for applying said signal train to said gates, and means responsive to said recurrent signal elements for opening said gates in succession to admit the signal elements representative of said different color components to the corresponding signal channels.

3. Color television apparatus comprising an image pick-up tube including a photoelectrically sensitive surface and scanning means for generating electrical signals representative of a light image projected on said surface, a color filter comprising cyclically recurring groups of differently colored filter elements with an opaque element between successive groups, said color filter being disposed to filter a light image projected to said surface to cause the signal output of said tube to comprise intercalated signal elements representative of different color components of the elements of the light image and with intervening signal elements of extreme amplitude corresponding to said opaque strips, a plurality of signal channels with one for each color component, a gate leading to each signal channel, means for applying said signal output to said gate, and means responsive to said signal elements of extreme amplitude for opening the gates in succession to admit the signal elements representative of different color components to the corresponding signal channel.

4. Apparatus according to claim 3, comprising means for illuminating said surface through said filter with a biassing light of mixed colors to cause said signal elements of extreme amplitude to be confined beyond black level for signal elements representative of different color components.

5. Apparatus according to claim 3, comprising means for illuminating the elements of said photoelectrically sensitive surface behind said opaque elements to cause said signal elements of extreme amplitude to be confined beyond peak white level for signal elements representative of different color components.

6. Color television apparatus comprising an image pick-up device for generating a signal train comprising signal elements intercalated according to a color sequence and representative of different color components of elements of the image, means for producing signal elements receiving in a predetermined sequence in said signal train and confined to a separate amplitude range from signal elements representing said different color components, a plurality of signal channels with one for each of said color components, a gate leading to each signal channel, means for applying said signal train to said gates, and a gating pulse generator synchronized by said recurring signal elements, said gates being responsive to pulses from said pulse generator to cause said gates to open in succession to admit the signal elements representative of different color components to the corresponding signal channels.

7. Color television apparatus, comprising a first image pick-up tube, a second image pick-up tube, each tube including a photoelectrically sensitive surface and scanning means for generating electrical signals representative of a light image projected on said surface, means for projecting light images of the same scene simultaneously on the photoelectrically sensitive surfaces of said tubes, a color filter comprising cyclically recurring groups of differently colored filter elements, said color filter being disposed to filter a light image projected to the photoelectrically sensitive surface of said first tube to cause the signal output of said first tube to comprise intercalated signal elements representative of different color components of elements of the light image, and means for modulating the signal output of said second tube with signals derived from said first tube to produce composite color television signals.

8. Color television apparatus, comprising a first image pick-up tube, a second image pick-up tube, each tube including a photoelectrically sensitive surface and scanning means for generating electrical signals representative of a light image projected on said surface, means for projecting light images of the same scene simultaneously on the photoelectrically sensitive surfaces of said tubes, a color filter comprising cyclically recurring groups of differently colored filter elements, said color filter being disposed to filter a light image projected to the photoelectrically sensitive surface of said first tube to cause the signal output of said first tube to comprise intercalated signal elements representative of different color components of elements of the light image, means for producing signal elements recurring in a predetermined sequence in the signal output of said first tube confined to a separate amplitude range from signal elements representing said different color components, a plurality of modulators with one corresponding to each of said color components, a plurality of gates with one leading to each modulator, means for applying the signal output of said first tube to said gates, means responsive to said recurring signal elements for opening said gates in succession to admit the ignal elements representative of said different color components to the corresponding modulators, and means for feeding the signal output of the second pick-up tube to said modulators for modulation by the respective color signal elements.

9. Apparatus according to claim 8, the means for producing said recurring signal elements including opaque elements in said filter between successive groups of colored elements.

10. Color television apparatus, comprising an image pick-up tube including a photoelectrically sensitive surface and scanning means for generating electrical signals representative of a light image projected on said surface, a color filter comprising cyclically recurring groups of differently colored filter elements, said color filter being disposed to filter a light image projected to said surface to cause the signal output of said tube to comprise intercalated signal elements representative of different color components of the elements of the light image, means for producing recurrent signal elements in said signal output confined to a separate amplitude range from signal elements representing said different color components, a plurality of signal channels with one for each of said color components, a gate leading to each signal channel, means for applying said signal output to said gates, means responsive to said recurrent signal elements for opening the gates in succession to admit the signal elements representative of said different color components to the corresponding signal channel, a source of signals of a reference frequency, means for comparing said recurrent signal elements with said reference frequency signals, and means for correcting nonuniformities of said scanning means in dependence upon differences in the frequencies of the compared signals.

References Cited in the file of this patent

UNITED STATES PATENTS

| | | |
|---|---|---|
| 2,490,812 | Huffman | Dec. 13, 1949 |
| 2,545,325 | Weimer | Mar. 13, 1951 |
| 2,545,957 | Kell | Mar. 20, 1951 |
| 2,552,070 | Sziklai | May 8, 1951 |
| 2,579,971 | Schade | Dec. 25, 1951 |
| 2,615,976 | Rose | Oct. 28, 1952 |
| 2,621,245 | Kell | Dec. 9, 1952 |
| 2,641,642 | Behrend | June 9, 1953 |
| 2,641,643 | Wentworth | June 9, 1953 |